(12) United States Patent
Fiore

(10) Patent No.: US 11,826,911 B2
(45) Date of Patent: Nov. 28, 2023

(54) METHOD AND SYSTEM FOR CONTROLLING A ROBOT

(71) Applicant: KUKA Deutschland GmbH, Augsburg (DE)

(72) Inventor: Mario Daniele Fiore, Augsburg (DE)

(73) Assignee: KUKA Deutschland GmbH, Augsburg (DE)

( * ) Notice: Subject to any disclaimer, the term of this patent is extended or adjusted under 35 U.S.C. 154(b) by 319 days.

(21) Appl. No.: 16/767,766

(22) PCT Filed: Nov. 20, 2018

(86) PCT No.: PCT/EP2018/081903
§ 371 (c)(1),
(2) Date: May 28, 2020

(87) PCT Pub. No.: WO2019/105801
PCT Pub. Date: Jun. 6, 2019

(65) Prior Publication Data
US 2020/0361086 A1    Nov. 19, 2020

(30) Foreign Application Priority Data

Dec. 1, 2017   (DE) ...................... 10 2017 011 130.8

(51) Int. Cl.
*B25J 9/16*       (2006.01)
*G05B 19/4155*    (2006.01)

(52) U.S. Cl.
CPC ........ *B25J 9/1643* (2013.01); *G05B 19/4155* (2013.01); *G05B 2219/39172* (2013.01);
(Continued)

(58) Field of Classification Search
CPC ...... B25J 9/1643; B25J 9/1607; B25J 9/1628; B25J 9/1633; B25J 9/1664; B25J 5/007;
(Continued)

(56) References Cited

U.S. PATENT DOCUMENTS 5,550,953 A    8/1996  Seraji
5,737,500 A *  4/1998  Seraji ..................... B25J 9/1643
                                              700/262
(Continued)

FOREIGN PATENT DOCUMENTS

CN    101722516 A    6/2010
DE    102009007181 A1   8/2010
(Continued)

OTHER PUBLICATIONS

A. De Santis et al, "A unified fuzzy logic approach to trajectory planning and inverse kinematics for a fire fighting robot operating in tunnels", Intelligent Service Robotics, Berlin/Heidelberg, (May 12, 2007), vol. 1, No. 1, doi:10.1007/s11370-007-0003-2, ISSN 1861-2776, pp. 41-49, XP055564009 [X] 1-9,11,12 * p. 42, col. 2—p. 45, col. 2 *.

(Continued)

*Primary Examiner* — Dale Moyer
*Assistant Examiner* — Tanner L Cullen
(74) *Attorney, Agent, or Firm* — Dorton & Willis, LLP

(57) ABSTRACT

A method for controlling a robot to perform a task, for which the robot is redundant, includes specifying an adjustment of first and second axes of at least one pair of two movement axes of the robot based on a specified operating mode such that both axes can be adjusted and adjustment of the first axis is prioritized over the second axis if a first operating mode is specified. Adjustment of the second axis is prioritized over the first axis if a second operating mode is specified. Additionally or alternatively, adjustment of at least one selected movement axis is specified based on a specified operating mode such that this axis can be adjusted or is blocked independently of the task if a reduced operating mode is specified, and can be adjusted for the purpose of (Continued)

performing this task if an operating mode differing from this reduced operating mode is specified.

12 Claims, 1 Drawing Sheet

(52) U.S. Cl.
CPC .............. *G05B 2219/40298* (2013.01); *G05B 2219/40367* (2013.01)

(58) Field of Classification Search
CPC ........ B25J 9/162; B25J 9/1656; B25J 9/1612; G05B 2219/40367; G05B 2219/39415; G05B 2219/40365; G05B 19/4155; G05B 2219/40298
See application file for complete search history.

(56) References Cited

U.S. PATENT DOCUMENTS

| | | | |
|---|---|---|---|
| 8,456,123 B2 | 6/2013 | Nishiuchi et al. | |
| 8,756,606 B2 | 6/2014 | Taira et al. | |
| 9,616,564 B2 | 4/2017 | Pfaff | |
| 2011/0029133 A1* | 2/2011 | Okazaki | B25J 9/0087 700/258 |
| 2011/0071677 A1* | 3/2011 | Stilman | B25J 5/007 700/254 |
| 2012/0004775 A1* | 1/2012 | Andoh | B25J 9/06 901/47 |
| 2014/0081461 A1* | 3/2014 | Williamson | B25J 9/1643 700/261 |
| 2015/0127151 A1 | 5/2015 | Riedel et al. | |
| 2015/0217445 A1 | 8/2015 | Hietmann et al. | |
| 2015/0290796 A1* | 10/2015 | Iwatake | B25J 13/085 700/258 |
| 2016/0030116 A1 | 2/2016 | Mewes | |
| 2019/0084155 A1* | 3/2019 | Toshimitsu | B25J 9/1694 |
| 2019/0133791 A1* | 5/2019 | Yadav | A61B 34/20 |
| 2019/0328479 A1* | 10/2019 | Wada | G02B 21/0012 |

FOREIGN PATENT DOCUMENTS

| | | | |
|---|---|---|---|
| DE | 102013222456 A1 | 5/2015 | |
| DE | 102013227147 A1 | 6/2015 | |
| DE | 102014202145 A1 | 8/2015 | |
| DE | 102014222809 B3 | 1/2016 | |
| DE | 102014214861 A1 | 2/2016 | |
| JP | 2008036761 A | 2/2008 | |
| JP | 2011183527 A | 9/2011 | |
| WO | 2012104899 A1 | 8/2012 | |
| WO | 2014043702 A1 | 3/2014 | |
| WO | WO-2017033361 A1 * | 3/2017 | ............ B25J 9/1653 |

OTHER PUBLICATIONS

Tan Fung Chan et al, "A Weighted Least-Norm Solution Based Scheme for Avoiding Joint Limits for Redundant Joint Manipulators", IEEE Transactions on Robotics and Automation, IEEE Inc, New York, US, (Apr. 1, 1995), vol. 11, No. 2, doi:10.1109/70.370511, ISSN 1042-296X, pp. 286-292, XP000505320 [X] 1-3,11,12 * the whole document *.

Ji Xiang et al, "General-Weighted Least-Norm Control for Redundant Manipulators", IEEE Transactions on Robotics., US, (Aug. 1, 2010), vol. 26, No. 4, doi:10.1109/TRO.2010.2050655, ISSN 1552-3098, pp. 660-669, XP055564092 [A] 1-12 * the whole document *.

European Patent Office; Search Report in related International Patent Application No. PCT/EP2018/081903 dated Mar. 15, 2019; 2 pages.

European Patent Office; Written Opinion in related International Patent Application No. PCT/EP2018/081903 dated Mar. 15, 2019; 12 pages.

German Patent Office; Examination Report in related German Patent Application No. 10 2017 011 130.8 dated May 28, 2018; 5 pages.

Chinese Patent Office; Examination Report in related Chinese Patent Application No. 2018800777666 dated Feb. 14, 2023; 9 pages.

\* cited by examiner

METHOD AND SYSTEM FOR CONTROLLING A ROBOT

CROSS-REFERENCE TO RELATED APPLICATIONS

This application is a national phase application under 35 U.S.C. § 371 of International Patent Application No. PCT/EP2018/081903, filed Nov. 20, 2018 (pending), which claims the benefit of priority to German Patent Application No. DE 10 2017 011 130.8, filed Dec. 1, 2017, the disclosures of which are incorporated by reference herein in their entirety.

TECHNICAL FIELD

The present invention relates to a method and a system for controlling a robot for carrying out a task, with respect to which the robot is redundant.

BACKGROUND

If a robot has more degrees of freedom than a task requires, said robot is redundant with respect to said task. It is thus possible, for example, for a robot arm having more than seven movement axes, or a mobile robot having a displaceable platform and a six-axis robot arm to in general achieve a specified three-dimensional position and orientation of an end-effector, in an infinite number of robot poses. Similarly, it is possible, for example, for a six-axis robot arm to achieve a predetermined three-dimensional position of an end-effector that can be oriented as desired, in an infinite number of possible poses.

The object of the present invention is that of improving the control of robots for carrying out tasks.

SUMMARY

This object is achieved by a method, a system, or a computer program product for carrying out a method as described herein.

According to an embodiment of the present invention, in order to control a robot for carrying out a task, with respect to which the robot is redundant, for one or more pairs of two movement axes (in each case) of the robot, (in each case) an adjustment of a first of said two axes and an adjustment of a second of said two axes is specified, depending on an operating mode specification, such that:

both axes are adjustable or may be adjusted for carrying out said task, in particular are adjusted, and the adjustment of the first axis is prioritized over the adjustment of the second axis if a first operating mode is specified, and both axes are adjustable or may be adjusted for carrying out said task, in particular are adjusted, and the adjustment of the second axis is prioritized over the adjustment of the first axis if a second operating mode is specified.

As a result, in one embodiment the two axes (in each case) can be used advantageously in a manner appropriate to the situation.

As already explained above, a robot is redundant with respect to a task if it can carry out the task in a plurality of, in particular in an infinite number of, different poses, and/or has more degrees of freedom that the task (requires), i.e. in particular if $\dot{\sigma}_d = J \cdot \dot{q}$ applies, having the task $\dot{\sigma}_d \in \mathfrak{R}^m$ and the degrees of freedom or (adjustments of the) movement axes $\dot{q} \in \mathfrak{R}^{n>m}$.

The task can comprise a plurality of, in particular hierarchized, partial tasks, for example travelling a specified path of an end-effector, and in the process preventing collisions, or the like.

The two axes of the or a pair may be (kinematically or structurally) adjacent axes. Similarly, one or more axes of the robot may also be arranged (kinematically or structurally) between the two axes. An axis of the robot can simultaneously be an axis of two or more pairs of two movement axes (in each case), within the meaning of the present invention.

In one embodiment a (reliable, in particular implemented) relative or absolute adjustment of an axis has a larger value than a (reliable or implemented) relative or absolute adjustment of another axis, if or in that the adjustment of one axis is prioritized over the adjustment of the other axis, an absolute adjustment of an axis referring in particular to a travel range and/or a velocity of the axis, in particular the magnitude thereof, and a relative adjustment of an axis referring in particular to a travel range or the magnitude thereof, and/or a velocity of the axis and/or the magnitude thereof divided by a reference value, in particular a maximum (possible or permissible) travel range or velocity, of the axis. In other words, one axis may be adjusted more significantly or is adjusted more significantly than another axis, if or in that the adjustment of one axis is prioritized over the adjustment of the other axis. In one embodiment, an adjustment of one axis is prioritized over an adjustment of another axis, in that the adjustment of one axis is more strongly weighted in a quality factor of an optimization, by means of which the adjustments are specified.

In one embodiment, in the first operating mode the adjustment of the first axis is of a first magnitude, and the adjustment of the second axis is of an, in particular smaller, second magnitude, and in the second operating mode the adjustment of the first axis is of a magnitude that is smaller than the first and/or second magnitude, and/or the adjustment of the second axis is of an, in particular larger, magnitude that is larger than the first and/or second magnitude. In other words, in the second operating mode the adjustment of one axis is reduced compared with (the adjustment of the first axis in) the first operating mode, and/or the adjustment of the second axis is increased compared with (the adjustment of the second axis in) the first operating mode.

In one embodiment, if a third operating mode is specified, both axes of the or one or a plurality of the pair(s) are (in each case) adjustable or may be adjusted for carrying out the task, in particular are adjusted, the adjustment of the first axis being more greatly prioritized over the adjustment of the second axis than is the case in the first operating mode. In other words, in the third operating mode the adjustment of the first axis is increased compared with (the adjustment of the first axis in) the first operating mode.

In addition or alternatively, in one embodiment, if a fourth operating mode is specified, both axes of the or one or a plurality of the pairs are (in each case) adjustable or may be adjusted for carrying out the task, in particular are adjusted, the adjustment of the second axis being more greatly prioritized over the adjustment of the first axis than is the case in the second operating mode. In other words, in the fourth operating mode the adjustment of the second axis is increased compared with (the adjustment of the second axis in) the second operating mode.

As a result, in one embodiment the two axes (in each case) can be used even more advantageously in a manner appropriate to the situation.

In addition or alternatively, in one embodiment an adjustment of at least one third movement axis of the robot is specified depending on the operating mode specification, such that:

the third axis is adjustable or may be adjusted, in particular is adjusted, for carrying out the task, and the adjustment of the third axis is prioritized over the adjustment of the first axis if a first variant of the first operating mode is specified, and/or the third axis is adjustable or may be adjusted, in particular is adjusted, for carrying out the task, and the adjustment of the first axis and second axis is prioritized over the adjustment of the third axis if a second variant of the first operating mode and/or a second variant of the third operating mode is specified, and/or the third axis is adjustable or may be adjusted, in particular is adjusted, for carrying out the task, and the adjustment of the first axis is prioritized over the adjustment of the third axis, and the adjustment of the third axis is prioritized over the adjustment of the second axis, if a third variant of the first operating mode and/or a third variant of the third operating mode is specified;

and/or such that the third axis is adjustable or may be adjusted, in particular is adjusted, for carrying out the task, and the adjustment of the third axis is prioritized over the adjustment of the second axis if a first variant of the second operating mode is specified and/or if a first variant of the fourth operating mode is specified; and/or the third axis is adjustable or may be adjusted, in particular is adjusted, for carrying out the task, and the adjustment of the second axis and first axis is prioritized over the adjustment of the third axis if a second variant of the second operating mode is specified and/or if a first variant of the fourth operating mode is specified; and/or the third axis is adjustable or may be adjusted, in particular is adjusted, for carrying out the task, and the adjustment of the second axis is prioritized over the adjustment of the third axis, and the adjustment of the third axis is prioritized over the adjustment of the first axis, if a third variant of the second operating mode and/or a first variant of the fourth operating mode is specified.

As a result, in one embodiment the at least three axes can be used advantageously in a manner appropriate to the situation.

In addition or as an alternative to the aspect, described herein, of the different prioritization of axes in different operating modes or variants, according to an embodiment or a (further) aspect of the present invention, in order to control a or the robot for carrying out a or the task, with respect to which the robot is redundant, for one or more selected movement axis/axes of the robot, (in each case) an adjustment is specified, depending on an operating mode specification, such that, in order to carry out said task, said axis is adjustable or may be adjusted, in particular is adjusted, independently of the task, or is blocked if a reduced operating mode is specified; and is adjustable or may be adjusted, in particular is adjusted, in order to carry out said task, if an operating mode is specified that is different from said reduced operating mode, according to one embodiment of the present invention said operating mode that is different from the reduced operating mode, or said reduced operating mode is the first or second operating mode described herein; and/or the adjustment of said axis is specified, depending on the operating mode specification, prior to operation of the robot.

It is thus possible, in one embodiment, that, in a first operating mode and/or in a second operating mode, in particular in the first, second or third variant thereof, in the first and second axis at least one pair of two movement axes, and optionally at least one third movement axis, can be adjusted or are adjusted, for carrying out the task, said adjustments being assigned different priorities, and in addition one or more further selected movement axes being blocked or being adjusted independently of the task or not for the purpose of carrying out the task.

Therefore, in one embodiment, the reduced operating mode is the first or second operating mode, and the selected axis is an axis that is different from the first and second axis.

In addition or alternatively, according to this aspect, it is also possible for the first and/or second axis to be blocked, in a reduced operating mode that is different from the first and second operating mode, or to be adjusted independently of the task or not for the purpose of carrying out the task.

Therefore, in one embodiment, the operating mode that is different from the reduced operating mode is the first or second operating mode, and the selected axis is the first or second axis.

As a result, in one embodiment, axes can be used even more advantageously in a manner appropriate to the situation.

In addition or alternatively, according to this aspect, it is also possible for movement axes to be blocked prior to operation, in particular a movement, of the robot.

As a result, in one embodiment the specification can be used in an improved manner, in particular also for (offline) path planning.

Accordingly, in one embodiment, one or more of the operating modes and/or the variants (thereof) are (in each case) specified prior to operation, in particular a movement, of the robot. In addition or alternatively, in one embodiment, one or more of the operating modes, in particular the first and/or second operating mode, and/or the variants (thereof) are (in each case) specified, in particular changed, during operation, in particular a movement, of the robot.

The embodiments or developments described here can be combined with one or more of the aspects described herein.

As a result, in one embodiment, the axes can be used even more advantageously in a manner appropriate to the situation.

In one embodiment, one or more of the operating modes and/or the variant(s) (thereof) are (in each case) specified on the basis of an, in particular by an, actuation of a switch, in particular a physical or software switch. In addition or alternatively it is also possible, in one embodiment, for one or more of the operating modes and/or the variant(s) (thereof) to be specified (in each case) on the basis of, in particular by, selecting an operational program of the robot. In addition or alternatively it is also possible, in one embodiment, for one or more of the operating modes and/or the variant(s) (thereof) to be specified (in each case) on the basis of, in particular by, contact with a joint or link of the robot, in particular on the basis of or depending on the strength, direction and/or surface area thereof.

As a result, in one embodiment operating modes or variants can be advantageously, in particular intuitively, quickly, reliably and/or precisely specified.

In one embodiment, one or more of the operating modes and/or variants are (in each case) specified by one or more parameters having a continuous value range. Therefore, in one embodiment, the prioritization between at least two axes can be changed in a stepless manner in one embodiment.

As a result, in one embodiment, the axes can be used even more advantageously in a manner appropriate to the situation.

In one embodiment, the task may comprise, in particular be, manual guidance of the robot, in particular by means of manual loading of at least one link of the robot by a guide force, and/or travelling a specified path of a reference fixed to the robot, in particular of an end-effector.

These are particularly advantageous applications of the present invention. In one embodiment, the robot comprises a movable, in particular mobile, platform, and/or an in particular multi-jointed robot arm.

In one embodiment, the first axis is a movement axis of the movable platform or of the robot arm. In addition or alternatively, in one embodiment, the second axis is a movement axis of the movable platform or of the robot arm. In addition or alternatively, in one embodiment, the third axis is a movement axis of the movable platform or of the robot arm. In addition or alternatively, in one embodiment, the selected axis is a movement axis of the movable platform or of the robot arm.

In one embodiment, the selected axis is blocked in a motorized manner when the reduced operating mode is specified.

As a result, in one embodiment, said axis can advantageous be immediately adjusted again by the motor, upon switching out of the reduced operating mode.

In one embodiment, prioritization or blocking of axes can be achieved by specifying the adjustment of the movement axes $q=[q_1, \ldots, q_n]$ of the robot for carrying out a task $\dot{\sigma}_d = J \cdot \dot{q}$, by means of a weighting matrix W, in particular in the form $$\dot{q} = W \cdot J^T \cdot (J \cdot W J^T)^{-1} \cdot \dot{\sigma}_d$$

where, in said weighting matrix, (more highly) prioritized axes have a higher value, and blocked axes are disregarded by said weighting matrix, or the weighting matrix exhibits zeros in the corresponding rows and columns.

If, in the reduced operating mode, instead of blocking, a task-independent adjustment of one or more axes is permitted or carried out, this can be achieved in that, in addition, said task-independent adjustment(s) is/are specified as a further task, for the performance of which, vice versa, only said axis/axes is/are then used (may be used).

According to one embodiment of the present invention, a system for controlling the robot for carrying out the task is designed, in particular in terms of hardware and/or software, in particular in terms of programming technology, to carry out a method described herein, and/or comprises:

means for specifying an adjustment of a first second axis of at least one pair consisting of two movement axes of the robot, depending on an operating mode specification, such that both axes are adjustable for carrying out said task and the adjustment of the first axis is prioritized over the adjustment of the second axis if a first operating mode is specified, and both axes are adjustable for carrying out said task and the adjustment of the second axis is prioritized over the adjustment of the first axis if a second operating mode is specified; and/or means for specifying an adjustment of at least one selected movement axis depending on an operating mode specification such that, in order to carry out said task, said axis is adjustable, independently of the task, or is blocked, if a reduced operating mode is specified, and is adjustable for carrying out said task if an operating mode is specified that is different from said reduced operating mode, said operating mode that is different from the reduced operating mode, or the reduced operating mode, being the first or second operating mode, and/or the adjustment of said axis being specified, depending on the operating mode specification, prior to operation of the robot.

In one embodiment, the system or the means thereof comprises/comprise: means for more greatly prioritizing the adjustment of the first axis over the adjustment of the second axis than is the case in the first operating mode, if a third operating mode is specified in which both axes are adjustable in order to carry out the task; and/or means for more greatly prioritizing the adjustment of the second axis over the adjustment of the first axis than is the case in the second operating mode, if a fourth operating mode is specified in which both axes are adjustable in order to carry out the task; and/or means for specifying an adjustment of at least one third movement axis of the robot depending on the operating mode specification, such that the third axis is adjustable for carrying out the task, and the adjustment of the third axis is prioritized over the adjustment of the first axis if a first variant of the first operating mode and/or a first variant of the third operating mode is specified; and/or the third axis is adjustable for carrying out the task, and the adjustment of the first axis and second axis is prioritized over the adjustment of the third axis if a second variant of the first operating mode and/or a second variant of the third operating mode is specified; and/or the third axis is adjustable for carrying out the task, and the adjustment of the first axis is prioritized over the adjustment of the third axis, and the adjustment of the third axis is prioritized over the adjustment of the second axis, if a third variant of the first operating mode and/or a third variant of the third operating mode is specified; and/or in that the third axis is adjustable for carrying out the task, and the adjustment of the third axis is prioritized over the adjustment of the second axis if a first variant of the second operating mode and/or a first variant of the fourth operating mode is specified; and/or the third axis is adjustable for carrying out the task, and the adjustment of the second axis and first axis is prioritized over the adjustment of the third axis if a second variant of the second operating mode and/or a first variant of the fourth operating mode is specified; and/or the third axis is adjustable for carrying out the task, and the adjustment of the second axis is prioritized over the adjustment of the third axis, and the adjustment of the third axis is prioritized over the adjustment of the first axis, if a third variant of the second operating mode and/or a first variant of the fourth operating mode is specified; and/or means for blocking the selected axis in a motorized manner when the reduced operating mode is specified; and/or means for specifying at least one operating mode and/or at least one variant prior to and/or during operation of the robot; and/or means for specifying at least one operating mode and/or at least one variant on the basis of actuation of a switch, contact with a joint or link of the robot, and/or a selection in an operational program of the robot; and/or means for specifying at least one operating mode and/or at least one variant by means of at least one parameter having a continuous value range.

A means within the meaning of the present invention may be designed so as to be hardware-based and/or software-based, and may in particular comprise an in particular digital processing unit, in particular microprocessor unit (CPU), which is preferably in data or signal connection with a memory and/or bus system, and/or one or more programs or program modules. The CPU may be designed to process commands that are implemented as a program stored in a memory system, to detect input signals from a data bus, and/or to emit output signals to a data bus. A memory system may comprise one or more, in particular different, storage media, in particular optical, magnetic, solid state, and/or other nonvolatile media. The program may be configured such that it embodies or is capable of executing the methods described herein, such that the CPU may carry out the steps of such methods and can thus in particular control the robot. In one embodiment, a computer program product may comprise, in particular be, an, in particular nonvolatile, storage medium for storing a program or having a program stored thereon, execution of said program triggering a system or a controller, in particular a computer, to execute a method described herein or one or more of the steps thereof.

In one embodiment, one or more, in particular all, of the steps of the method are performed in a completely or partially automated manner, in particular by the system or the means thereof.

In one embodiment, the system comprises the robot and/or the controller thereof. In the present case, controlling is in particular also to be understood as regulation and/or path planning which, in one embodiment, is carried out offline or prior to operation of the robot.

A movement axis of a robot can in particular comprise, in particular be, a rotational axis of a swivel joint or a translational or displacement axis of a sliding joint of a robot arm, or an, in particular translational or rotational, movement direction of a platform.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
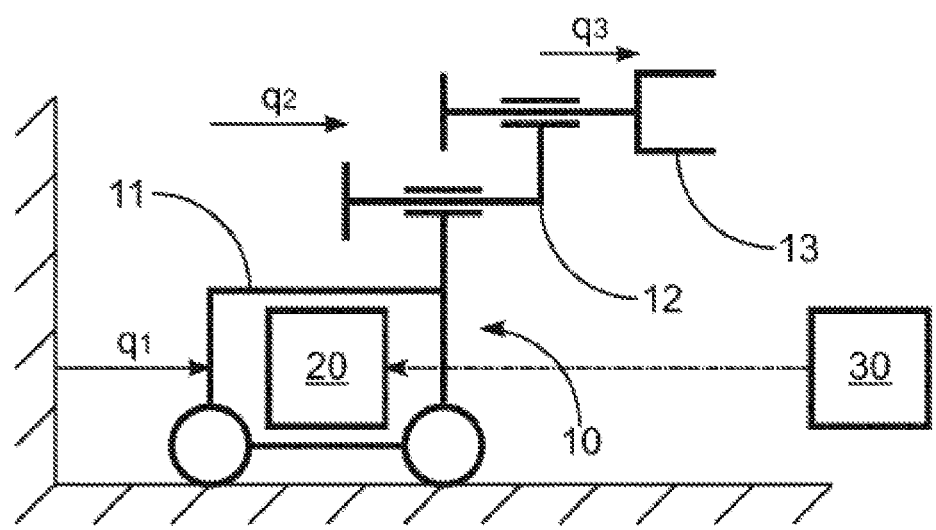
FIG. 1 illustrates a system according to an embodiment of the present invention.

FIG. 1 shows a system according to one embodiment of the present invention, comprising a robot 10 having a movable base 11 and a robot arm arranged thereon, as well as a controller 20 for controlling the robot.

For reasons of simplified representation, in the embodiment the movable base 11 has, by way of example, just one linear movement axis or one translational degree of freedom of movement, and the robot arm has just two linear movement axes or translational degrees of freedom which are offset in parallel therewith, a position of the axes being described by a joint coordinate $q_1$ of the movable base 11, a joint coordinate $q_2$ of a carriage 12 of the robot arm relative to the movable base 11, and a joint coordinate $q_3$ of a gripper 13 of the robot arm relative to the carriage 12.

This is, as already mentioned, purely by way of example and for the purpose of simplified representation. In modifications that are not shown, in particular the movable platform may be omitted and/or further translational and/or rotational degrees of freedom or movement axes, and/or the robot arm can additionally or alternatively have rotatable and/or (further) translational degrees of freedom or movement axes.

Likewise for reasons of simplified representation, by way of example a task in the form of a specified horizontal target velocity for the gripper 13, relative to the surroundings, is specified, for example in advance, by means of path planning, or during operation, by means of manual guidance.

Figure 2:
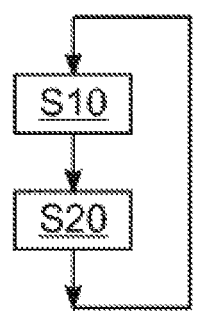
FIG. 2 shows a method for controlling a robot of the system according to an embodiment of the present invention.

In a step S10 (cf. FIG. 2) of a method for controlling the robot 10 according to an embodiment of the present invention, a robot controller 20 detects an operating mode specification.

For this purpose, an operator can specify various operating modes, in advance and/or during operation of the robot, by means of corresponding contact with the joints or actuation of switches on an input device 30, in that said operator adjusts the parameters $w_1$, $w_2$, $w_3$ of a diagonal matrix W=diag{$w_1$, $w_2$, $w_3$}, in a stepless manner, between 0 and 1 ($w_1+w_2+w_3 \neq 0$).

In a step S20, the velocities of the three axes are then specified according to $$\dot{q} = \begin{bmatrix} \dot{q}_1 \\ \dot{q}_2 \\ \dot{q}_3 \end{bmatrix} = W \cdot J^T \cdot (J \cdot WJ)^{-1} \cdot \dot{x}_d = \frac{\dot{x}_d}{w_1 + w_2 + w_3} \cdot \begin{bmatrix} w_1 \\ w_2 \\ w_3 \end{bmatrix}$$

J=[1 1 1] denoting the Jacobian matrix of said task, and the drives of the robot 10 are actuated accordingly.

By combining said parameters accordingly, the operator can thus specify, inter alia, the following operating modes:

| $w_1$ | $w_2$ | $w_3$ | Operating mode | |
|---|---|---|---|---|
| 0.3 | 0.1 | 0.6 | 1st operating mode | 1st variant |
| 0.6 | 0.3 | 0.1 | | 2nd variant |
| 0.6 | 0.1 | 0.3 | | 3rd variant |
| 0.1 | 0.3 | 0.6 | 2nd operating mode | 1st variant |
| 0.3 | 0.6 | 0.1 | | 2nd variant |
| 0.1 | 0.6 | 0.3 | | 3rd variant |

In this case, for example the second and third line also constitute a first and third operating mode, since the adjustment of the first axis is more greatly prioritized over the adjustment of the second axis in the case of ($w_1$=0.6, $w_2$=0.3) than in the case of ($w_1$=0.6, $w_2$=0.3).

By combining the parameters accordingly, the operator can for example also specify the following operating modes:

| $w_1$ | $w_2$ | $w_3$ | Operating mode | Selected first/second movement axis |
|---|---|---|---|---|
| 1 | 0 | 0 | reduced operating mode | $q_2/q_3$ |
| 0 | 0.6 | 0.4 | first operating mode that is different from the reduced operating mode | $q_2/q_3$ |
| 0 | 0.4 | 0.6 | second operating mode that is different from the reduced operating mode | $q_2/q_3$ |

In this case, for the movement axis $q_1$ as the selected movement axis, the second and first line also represent a reduced operating mode ($w_1$=0) or an operating mode ($w_1$=1) that is different from said reduced operating mode.

Other specifications of the weightings, from the continuous value range [0, 1], make it possible for the user to accordingly also prioritize the individual axes differently, or to deactivate or block said axes.

It is clear, from this simple example alone, that very advantageous control of robots is possible thereby. Thus, for example in order to reposition the robot 10 between different operating stations, the user can block both degrees of freedom of the robot arm ($w_2=0$, $w_3=0$) and then, vice versa, block the degree of freedom of the platform, there, ($w_2=0$), and assign the two degrees of freedom of the robot arm different priorities, for example depending on the task, or the like. Said user can block faulty movement axes in a simple manner.

Although embodiments given by way of example have been explained in the preceding description, it is noted that a plurality of modifications are possible. It should furthermore be noted that the embodiments given by way of example are merely examples which are not intended to restrict the scope of protection, the applications, and the structure, in any way. Instead, the above description provides guidance for a person skilled in the art to implement at least one embodiment given by way of example, it being possible for various amendments to be made, in particular in view of the function and arrangement of the described components, without departing from the scope of protection as emerges from the claims and the combinations of features equivalent thereto.

LIST OF REFERENCE SIGNS 10 robot
11 platform
12 carriage
13 gripper
20 robot controller
30 input device

What is claimed is:

1. A method for controlling a robot for carrying out a task, wherein the robot is redundant with respect to the task and includes at least two movement axes, the method comprising:
specifying an adjustment of a first one of the movement axes and an adjustment of a second one of the movement axes depending on an operating mode specification of the robot such that:
both axes adjustably cooperate to carry out the task, and the adjustment of the first axis is prioritized over the adjustment of the second axis if a first operating mode is specified, and
both axes adjustably cooperate to carry out the task, and the adjustment of the second axis is prioritized over the adjustment of the first axis if a second operating mode is specified;
wherein the task comprises manual guidance of he robot; and wherein at least one of:
both axes adjustably cooperate to carry out the task, and the adjustment of the first axis is more greatly prioritized, with respect to time or importance, over the adjustment of the second axis, relative to the prioritization in the first operating mode, when a third operating mode is specified; or
both axes adjustably cooperate to carry out the task, and the adjustment of the second axis is more greatly prioritized, with respect to time or importance, over the adjustment of the first axis, relative to the prioritization in the second operating mode, when a fourth operating mode is specified.

2. The method of claim 1, further comprising:
specifying an adjustment of at least one third movement axis of the robot depending on the operating mode specification such that at least one of:
the third axis is adjustable for carrying out the task, and the adjustment of the third axis is prioritized over the adjustment of the first axis if a first variant of the first operating mode or a first variant of the third operating mode is specified;
the third axis is adjustable for carrying out the task, and the adjustment of the first axis and second axis is prioritized over the adjustment of the third axis if a second variant of the first operating mode or a second variant of the third operating mode is specified;
the third axis is adjustable for carrying out the task. and the adjustment of the first axis is prioritized over the adjustment of the third axis, and the adjustment of the third axis is prioritized over the adjustment of the second axis, if a third variant of the first operating mode or a third variant of the third operating mode is specified;
the third axis is adjustable for carrying out the task, and the adjustment of the third axis is prioritized over the adjustment of the second axis if a first variant of the second operating mode or a first variant of the fourth operating mode is specified;
the third axis is adjustable for carrying out the task, and the adjustment of the second axis and first axis is prioritized over the adjustment of the third axis if a second variant of the second operating mode or a first variant of the fourth operating mode is specified: or
the third axis is adjustable for carrying out the task, and the adjustment of the second axis is prioritized over the adjustment of the third axis, and the adjustment of the third axis is prioritized over the adjustment of the first axis, if a third variant of the second operating mode or a first variant of the fourth operating mode is specified.

3. The method of claim 2, wherein:
the robot comprises at least one of a movable platform or a robot arm;
at least one of the first axis or the second axis is a movement axis of the movable platform or a movement axis of the robot arm; and
the third axis is a movement axis of the movable platform or of the robot arm.

4. The method of claim 1, wherein:
the robot comprises at least one of a movable platform or a robot arm; and
at least one of the first axis or the second axis is a movement axis of the movable platform or a movement axis of the robot arm.

5. The method of claim 1, wherein the task comprises travelling a specified path of a reference fixed to the robot.

6. A method for controlling a robot for carrying out a task, wherein the robot is redundant with respect to the task and includes at least a first movement axis or a second movement axis, the method comprising:
specifying an adjustment of at least one of the first movement axis and the second movement axis of the robot in order to carry out the task and depending on an operating mode specification; and specifying at least one of the operating mode or a variant of the operating mode based on an actuation of a switch, such that:

at least one of the first movement axis or the second movement axis is adjustable independently of the task or is blocked if a reduced operating mode is specified, and the at least one of the first movement axis or the second movement axis is adjustable for carrying out the task if an operating mode is specified that is different from the reduced operating mode, wherein either the reduced operating mode or the operating mode that is different from the reduced operating mode is (i) a first operating mode in which the first movement axis and the second movement axis cooperate to carry out the task and the adjustment of the first movement axis is prioritized over the adjustment of the second movement axis, or (ii) a second operating mode in which the first movement axis and the second movement axis cooperate to carry out the task and the adjustment of the second axis is prioritized over the adjustment he first movement axis; and wherein at least one of:

both axes adjustably cooperate to carry out the task, and the adjustment of the first axis is more greatly prioritized, with respect to time or importance, over the adjustment of the second axis, relative to the prioritization in the first operating mode, when a third operating mode is specified, or both axes adjustably cooperate to carry out the task, and the adjustment of the second axis is more greatly prioritized, with respect to time or importance, over the adjustment of the first axis, relative to the prioritization in the second operating mode, when a fourth operating mode is specified.

7. The method of claim 6, wherein at least one of:
the at least one of the first movement axis or the second movement axis is blocked in a motorized manner when the reduced operating mode is specified; or
the robot comprises at least one of a movable platform or a robot arm, and the at least one of the first movement axis or the second movement axis is a movement axis of the movable platform or of the robot arm.

8. The method of claim 6, further comprising at least one of:
specifying the operating mode prior to or during operation of the robot, or
specifying the variant of he operating mode prior to or during operation of the robot.

9. The method of claim 6, further comprising specifying the at least one of the operating mode or the variant of the operating mode based on at least one of:
contact with a joint or link of the robot; or
a selection in an operational program of the robot.

10. The method of claim 6, further comprising specifying the at least one of the operating mode or the variant of the operating mode by at least one parameter having a continuous value range.

11. A system for controlling a robot for carrying out a task, wherein the robot is redundant with respect to the task, the task comprising manual guidance of the robot, the system comprising a nonvolatile storage medium having stored thereon a program or program module executable by a controller or computer, the program or program module comprising at least one of:

means for specifying an adjustment of a first axis and a second axis of at least two movement axes of the robot, depending on an operating mode specification specified by actuation of a switch, such that both axes adjustably cooperate to carry out the task and the adjustment of the first axis is prioritized over the adjustment of the second axis if a first operating mode is specified, and both axes adjustably cooperate to carry out the task and the adjustment of the second axis is prioritized over the adjustment of the first axis if a second operating mode is specified; or means for specifying an adjustment of at least one selected movement axis depending on an operating mode specification specified by actuation of the switch such that, in order to carry out said task, the movement axis is adjustable independently of the task or is blocked if a reduced operating mode is specified, and is adjustable for carrying out the task if an operating mode is specified that is different from the reduced operating mode, wherein the operating mode that is different from the reduced operating mode is the first or second operating mode; and wherein at least one of:

both axes adjustably cooperate to carry out the task, and the adjustment of the first axis is more greatly prioritized, with respect to time or importance, over the adjustment of the second axis, relative to the prioritization in the first operating mode, when a third operating mode is specified, or both axes adjustably cooperate to carry out the task, and the adjustment of the second axis is more greatly prioritized, with respect to time or importance, over the adjustment of the first axis, relative to the prioritization in the second operating mode, when a fourth operating mode is specified.

12. A computer program product for controlling a robot for carrying out a task, wherein the robot is redundant with respect to the task and includes at least two movement axes, the computer program product including a program code stored on a non-transitory, computer-readable medium, the program code, when executed by a processor, causing the processor to:

specify an adjustment of a first one of the movement axes and an adjustment of a second one of the movement axes depending on an operating mode specification of the robot such that:

both axes adjustably cooperate to carry out the task, and the adjustment of the first axis is prioritized over the adjustment of the second axis if a first operating mode is specified, and both axes adjustably cooperate to carry out the task, and the adjustment of the second axis is prioritized over the adjustment of the first axis if a second operating mode is specified;

wherein the task comprises manual guidance of the robot; and wherein at least one of:

both axes adjustably cooperate to carry out the task, and the adjustment of the first axis is more greatly prioritized, with respect to time or importance, over the adjustment of the second axis, relative to the prioritization in the first operating mode, when a third operating mode is specified, or both axes adjustably cooperate to carry out the task, and the adjustment of the second axis is more greatly prioritized, with respect to time or importance, over the adjustment of the first axis, relative to the prioritization in the second operating mode, when a fourth operating mode is specified.

* * * * *